US012665844B2

(12) United States Patent
Chatras et al.

(10) Patent No.: US 12,665,844 B2
(45) Date of Patent: *Jun. 23, 2026

(54) TRANSMISSION OF PACKETS RELATING TO A PROCESSING RULE

(71) Applicant: ORANGE, Issy-les-Moulineaux (FR)

(72) Inventors: Bruno Chatras, Paris (FR); Youssef Chadli, Issy les Moulineaux (FR)

(73) Assignee: ORANGE, Issy-les-Moulineaux (FR)

( * ) Notice: Subject to any disclaimer, the term of this patent is extended or adjusted under 35 U.S.C. 154(b) by 554 days.

This patent is subject to a terminal disclaimer.

(21) Appl. No.: 18/316,621

(22) Filed: May 12, 2023

(65) Prior Publication Data

US 2023/0283548 A1 Sep. 7, 2023

Related U.S. Application Data

(63) Continuation of application No. 16/788,871, filed on Feb. 12, 2020, now Pat. No. 11,700,199, which is a
(Continued)

(30) Foreign Application Priority Data

Nov. 5, 2014 (FR) ...................................... 1460701

(51) Int. Cl.
*H04L 45/64* (2022.01)
*H04L 9/40* (2022.01)
(Continued)

(52) U.S. Cl.
CPC ................ *H04L 45/64* (2013.01); *H04L 9/40* (2022.05); *H04L 45/38* (2013.01); *H04L 65/40* (2013.01);
(Continued)

(58) Field of Classification Search
CPC . H04L 45/64; H04L 9/40; H04L 45/38; H04L 65/40; H04L 67/125; H04L 69/00; H04L 69/16; H04L 69/22; H04L 12/1407
See application file for complete search history.

(56) References Cited

U.S. PATENT DOCUMENTS

| | | | |
|---|---|---|---|
| 7,809,353 B2 | 10/2010 | Brown et al. | |
| 10,594,603 B2 | 3/2020 | Chatras et al. | |

(Continued)

FOREIGN PATENT DOCUMENTS

KR 20130142505 A 12/2013

OTHER PUBLICATIONS

English Translation of KR 20130142505 A, 2013, Retrieved from PE2E Search on Dec. 17, 2025 (Year: 2013).*
(Continued)

*Primary Examiner* — Omar J Ghowrwal
(74) *Attorney, Agent, or Firm* — David D. Brush; Westman, Champlin & Koehler, P.A.

(57) ABSTRACT

A method of controlling a packet stream generated by an application installed in a mobile terminal, the stream being intended to be sent by the terminal over a communications network managed by an operator. The method includes the following acts implemented in the terminal, for at least one packet generated by the application: obtaining a first packet having a first header and payload data; transmitting a request message to a security module installed in the terminal, the message including a parameter of the first header; receiving a response from the security module, which includes an instruction relating to transmission of a second packet, the response being based on the parameter and established according to a processing rule; preparing the second packet by modifying the first header into a second header, based on the instruction, the second packet including the second
(Continued)

Figure 1:
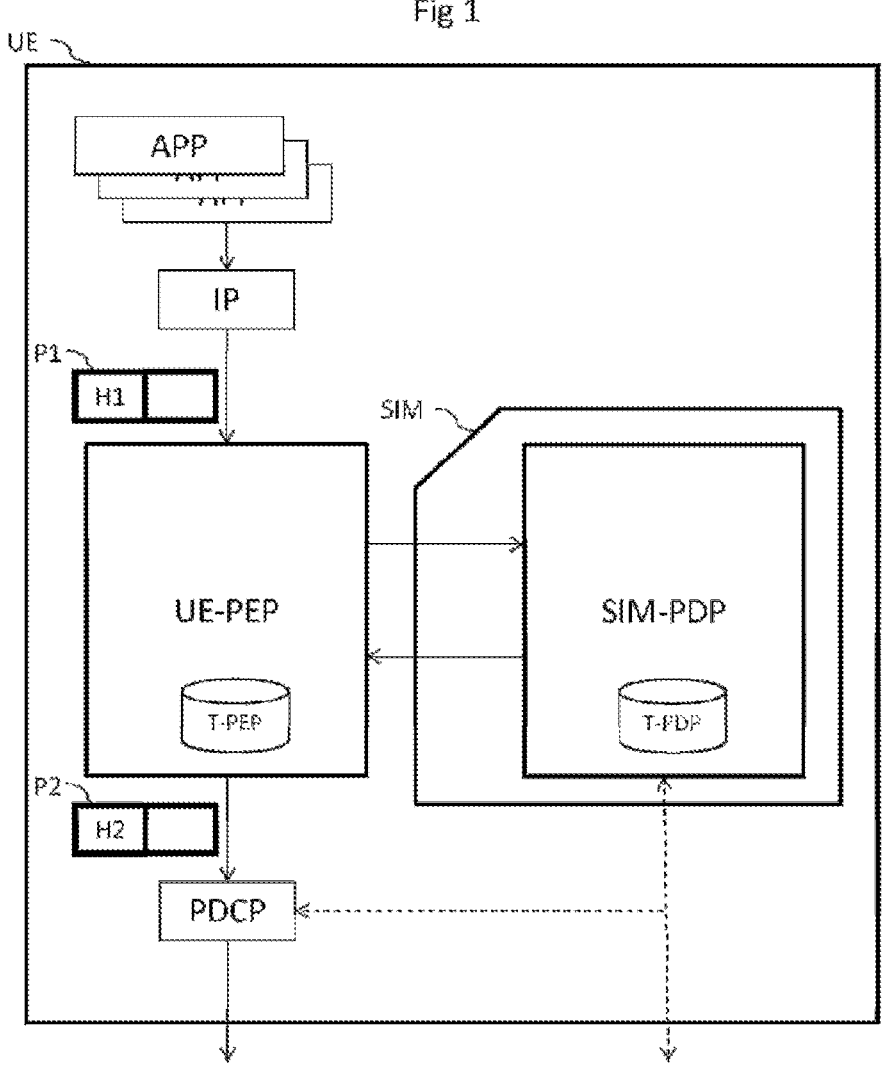

header and the payload data; and transmitting the second packet.

18 Claims, 3 Drawing Sheets

Related U.S. Application Data continuation of application No. 15/524,335, filed as application No. PCT/FR2015/052907 on Oct. 28, 2015, now Pat. No. 10,594,603.

(51) Int. Cl.

| | |
|---|---|
| *H04L 45/00* | (2022.01) |
| *H04L 65/40* | (2022.01) |
| *H04L 67/125* | (2022.01) |
| *H04L 69/00* | (2022.01) |
| *H04L 69/16* | (2022.01) |
| *H04L 69/22* | (2022.01) |
| *H04L 12/14* | (2024.01) |

(52) U.S. Cl.
CPC ............ *H04L 67/125* (2013.01); *H04L 69/00* (2013.01); *H04L 69/16* (2013.01); *H04L 69/22* (2013.01); *H04L 12/1407* (2013.01)

(56) References Cited

U.S. PATENT DOCUMENTS

| | | | | |
|---|---|---|---|---|
| 11,700,199 | B2 * | 7/2023 | Chatras | H04L 69/00 |
| | | | | 370/235 |
| 2004/0252701 | A1 | 12/2004 | Anandakumar et al. | |
| 2011/0092244 | A1 | 4/2011 | Lee et al. | |
| 2011/0310899 | A1 | 12/2011 | Alkhatib et al. | |
| 2012/0027016 | A1 | 2/2012 | Filsfils et al. | |
| 2012/0131222 | A1 | 5/2012 | Curtis et al. | |
| 2014/0254373 | A1 | 9/2014 | Varma | |
| 2015/0319086 | A1 | 11/2015 | Tripathi et al. | |
| 2017/0324656 | A1 | 11/2017 | Chatras et al. | |
| 2019/0140924 | A1 | 5/2019 | Koponen et al. | |

OTHER PUBLICATIONS

R. Yavatkar et al., "A Framework for Policy-based Admission Control", RFC 2753, Jan. 2020.

3GPP document TS 123.203 V12.6.0 (Sep. 2014) Digital cellular telecommunications system (Phase 2+); Universal Mobile Telecommunications System (UMTS); LTE; Policy and charging control architecture (3GPP TS 23.203 version 12.6.0 Release 12).

3GPP document TS 102.223 V12.1.0 (2014-09) Smart Cards; Card Application Toolkit (CAT) (Release 12).

S Blake et al., "An Architecture for Differentiated Services", RFC 2475, Dec. 1998.

Engilsh translation of the International Written Opinion dated Jan. 18, 2016 for corresponding International Application No. PCT/FR2015/052907, filed Oct. 28, 2015.

International Search Report dated Jan. 11, 2016 for corresponding International Application No. PCT/FR2015/052907, filed Oct. 28, 2015.

Office Action dated Nov. 27, 2018 for corresponding U.S. Appl. No. 15/524,335, filed May 4, 2017.

Final Office Action dated May 21, 2019 for corresponding U.S. Appl. No. 15/524,335, filed May 4, 2017.

Notice of Allowance dated Nov. 25, 2019 for corresponding U.S. Appl. No. 15/524,335, filed May 4, 2017.

Egilmez, Hilmi et al., "Open Qos: An Open Flow Controller Design for Multimedia Delivery with End-to-End Quality of Service over Software-Defined Networks", Signal & Information Processing Association Annual Summit and Conference (APSIPA ASC), 2012 Asia-Pacific, IEEE, Dec. 3, 2012 (Dec. 3, 2012), pp. 1-8, XP032309843.

Notice of Allowance dated Feb. 21, 2023 for corresponding U.S. Appl. No. 16/788,871, filed Feb. 12, 2020.

Office Action dated Apr. 28, 2022 for corresponding U.S. Appl. No. 16/788,871, filed Feb. 12, 2020.

Final Office Action dated Sep. 15, 2022 for corresponding U.S. Appl. No. 16/788,871, filed Feb. 12, 2020.

* cited by examiner

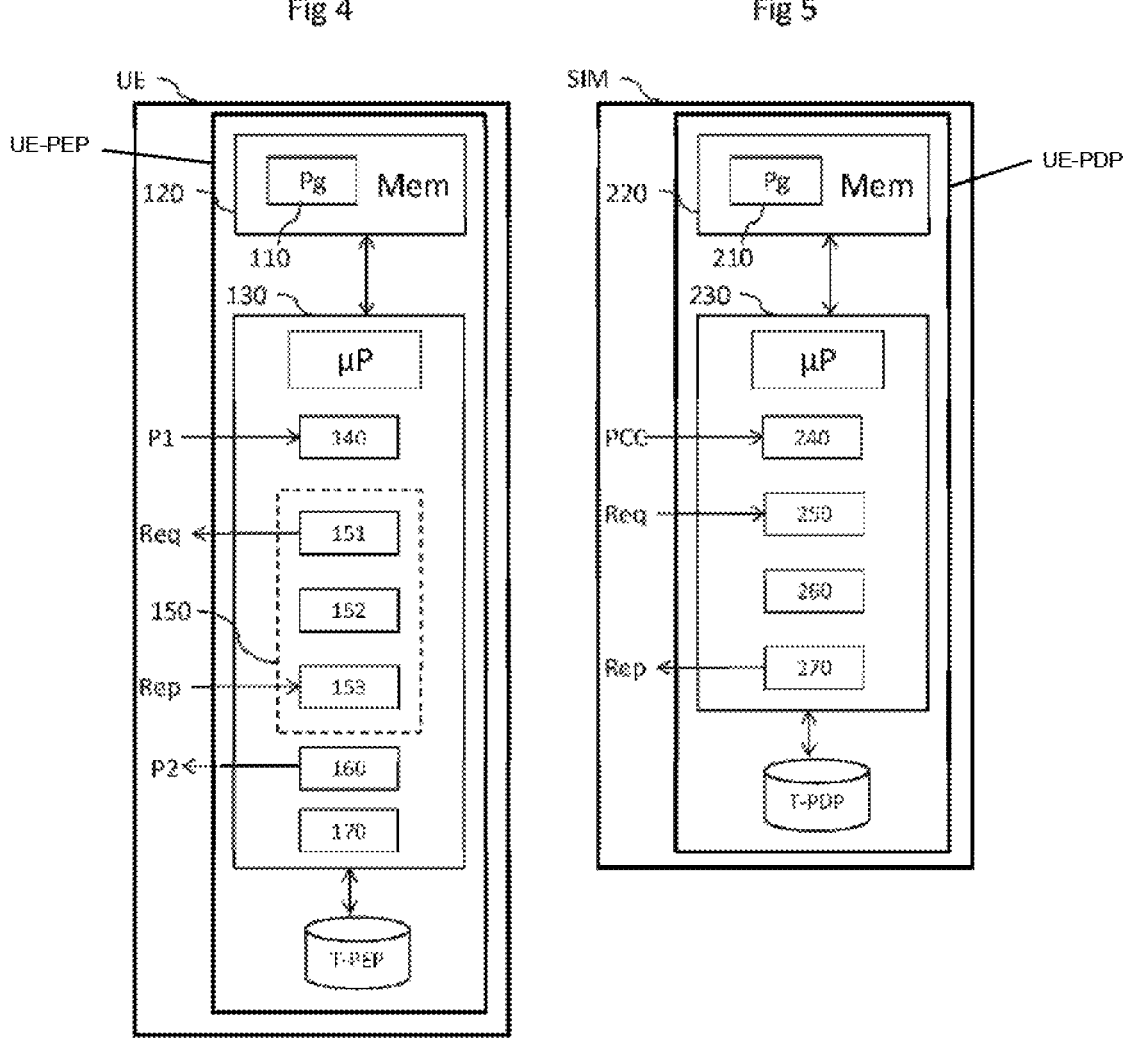
Fig 4                          Fig 5

TRANSMISSION OF PACKETS RELATING TO A PROCESSING RULE

1. CROSS-REFERENCE TO RELATED APPLICATIONS

This application is a Continuation of U.S. application Ser. No. 16/788,871, filed on Feb. 12, 2020, which is a Continuation of U.S. application Ser. No. 15/524,335, filed on May 4, 2017, which is a Section 371 National Stage Application of International Application No. PCT/FR2015/052907, filed Oct. 28, 2015, and published as WO 2016/071606 A1 on May 12, 2016, not in English, the contents of which are hereby incorporated by reference in their entireties.

2. FIELD OF THE DISCLOSURE

The present disclosure lies in the field of mobile networks allowing packet-mode operation and incorporating advanced service quality control functions, such as the so-called 3G, 4G or 5G (for $3^{rd}$, $4^{th}$ or $5^{th}$ generation) networks.

The 4G networks are also known as LTE ("Long Term Evolution") networks. 5G network denotes, hereinafter in this document, any network of a generation subsequent to LTE.

3. STATE OF THE ART

In the 3G and 4G networks, the PCC (Policy and Charging Control) architecture defined in the standard TS 23.203 by the 3GPP (Third Generation Partnership Project) allows an operator of these networks to dynamically apply policies for resource allocation and charging based on several criteria such as the profile of the users, the resources available, the characteristics and needs of the applications used. The policies to be applied are determined by an entity called PCRF (Policy and Charging Rule Function) which transmits them to entities called PCEF (Policy and Charging Enforcement Function) situated in the equipment items responsible for traffic routing. In the case where the PCC architecture is incorporated in the EPC (Evolved Packet Core) architecture, also defined by the 3GPP, a PCEF entity resides in the P-GW (Packet Data Network Gateway) equipment item giving access to the external networks, in particular to the internet. The control of the quality of service is then based on a "bearer" concept which represents the transport resources allocated to a set of traffic streams that have to be subjected to one and the same processing from the quality of service point of view. Each "bearer" has associated quality of service parameters to be taken into account by the PCEF and the other equipment items included on the path of the data streams. These parameters can be:

- QCI (QoS Class Identifier): identifier for the quality of service class;
- ARP (Allocation Retention Priority): priority for the allocation and retention of resources;
- MBR (Maximum Bit Rate), AMBR (Average MBR), GBR (Guaranteed Bit Rate): maximum bit rate, average maximum bit rate, guaranteed bit rate, in the downlink and uplink directions.

For example, a PCRF entity transmits to the PCEF rules authorizing or not authorizing the establishment of a "bearer" with a given quality of service, possibly limiting the bandwidth that can be used for this "bearer", authorizing or not authorizing the transmission of a packet transmitted by a terminal or intended for this terminal on this "bearer"

based on the header fields of the packet. The rules linked to the transmission of packets within a "bearer" are also transmitted to the terminal. It is considered that their application is performed in a software module that cannot be modified by the user. Typically, in a terminal of smartphone type with a two-processor architecture, the application of the rules is performed by software running in the baseband processor (sometimes called modem) and is not an application running the applications processor.

In the 5G networks, it is envisaged that the quality of service be managed directly at the IP layer level, in particular by relying on the marking, by the applications run by the terminal, of the packets transmitted by the applications, according to the Diffserv mechanism defined in the RFC2475 standard by the IETF (Internet Engineering Task Force). It remains possible for the operator to perform a certain number of checks, but with drawbacks relating to the quality of service, the authorization mechanism, and the processing of the uplink bandwidth.

In effect, the quality of service for the packets transmitted by a terminal up to the 5G equivalent of the P-GW will be dependent only on the marking applied by the terminal or by the application itself, with no connection to the policies of the operator.

Furthermore, any blocking of packets to unauthorized destinations will be able to be performed only at the level of the 5G equivalent of the P-GW, the path between the terminal and P-GW pointlessly consuming bandwidth resources.

Finally, any exceeding of uplink bandwidth will be able to be treated only at the level of the 5G equivalent of the P-GW, but only after the excess packets have followed a path on which the bandwidth is pointlessly used.

One of the aims of the invention is to remedy these drawbacks of the prior art.

4. SUMMARY

An exemplary embodiment of the disclosure remedies these drawbacks by having the terminal perform the controls imposed by the operator before the transmission of a packet. It can also be applicable in the context of an evolution of the 3G or 4G networks with quality of service differentiated within a "bearer".

An exemplary embodiment improves the situation using a method for controlling a packet stream generated by an application installed in a mobile terminal, the stream being intended to be transmitted by the terminal over a communications network managed by an operator, the method comprising the following steps implemented in the terminal, for all or some of the packets generated by the application:

- obtaining and analysis of a packet, called first packet,
- transmission by the terminal of a second packet based on the first packet and conforming to at least one processing rule established by the operator, based on the result of the analysis and if the result of the analysis authorizes the transmission.

Contrary to the prior art, the terminal itself analyzes and can therefore itself decide whether it can transmit a packet, and how it must do so, that is to say with what QoS parameters of the packet, without using a request to an external gateway, such as the P-GW, and without the latter previously establishing a "bearer". Since the terminal itself applies the packet transmission policies, under the control of the operator, it is therefore no longer necessary to establish a "bearer" prior to the transmission of packets.

According to one aspect of the present disclosure, the analysis step comprises the following steps:

a step of transmission of a request message to a security module installed in the terminal, the request message comprising at least one parameter based on the first packet, a step of reception of a response message from the security module, the response message comprising an instruction relating to the transmission of the second packet, the instruction being based on the at least one parameter and established according to the at least one processing rule.

When the processing to be applied to a packet cannot be immediately identified, contrary to the prior art in which a network element external to the terminal is interrogated, the terminal interrogates a security module, software or hardware, installed in the terminal, that can be included in a UICC (Universal Integrated Circuit Card) card also known as SIM (Subscriber Identification Module) card, or in the equivalent to a UICC card for the 5G networks.

According to one aspect of the disclosure, the request message comprises at least a part of the first packet.

The parameters transmitted in the request message can, for example, be parameters included in the header of the first packet, such as, for example, the DiffServ code, the destination IP address, the destination port, or the transport protocol to be used. The header of a packet, for example, contains information on the nature of the packet stream and on the quality of service that such a stream requires or must receive. A part of the header of the first packet can therefore be sufficient for the request message to be correctly processed by its recipient, which simplifies the construction of the request message.

According to one aspect of the disclosure, the step of reception of a response message is followed by a step of addition, in a table, of a routine rule based on the instruction and intended to be applied to packets of the stream following the first packet.

By virtue of this aspect, the steps of interrogation of the security module are avoided, for all the packets of a stream apart from the first which is the only one for which the analysis required the interrogation of the security module. The analysis is simplified and is reduced to the application of a routine rule based on an instruction which is itself based on a processing rule established by the operator.

According to another aspect of the disclosure, the analysis step comprises a step of searching, in the table, for a routine rule that can be associated with the first packet. In other words, the complete analysis with interrogation of the security module is necessary only for the first packet of one and the same application stream.

According to one aspect of the disclosure, the request message comprises the first packet and the response message comprises the second packet.

By virtue of this aspect, the so-called "packet-in/packet-out" mechanism of a protocol such as OpenFlow can be used between the terminal and its security module. In such a protocol, when a flow transmitter receives the first packet of a new stream, it interrogates a controller, called OpenFlow controller, in order to know how to route the stream. It does so by transmitting this first packet, called packet-in, to the controller. The controller responds by returning to it a packet called packet-out, identical to the packet-in except for the header which is modified to include all the instructions necessary to the correct routing, not only of this first packet but also of the subsequent packets in the stream.

According to this aspect, the first packet of the method is a packet-in, the second packet is a packet-out, and the security module, that is to say for example the SIM card, comprises an OpenFlow controller.

According to one aspect of the disclosure, a packet comprises a header and payload data, and the second packet based on the first comprises a header different from the header of the first packet.

By virtue of this aspect, the payload data in the packets of a stream are not modified in a second packet. It is the header of the packets which is modified and contains indications on the processing to be applied to the stream.

The various aspects of the control method which have just been described can be implemented independently of one another or in combination with one another.

The disclosure relates also to a method for determining an instruction relating to the transmission of a first packet included in a packet stream generated by an application installed in a mobile terminal, the stream being intended to be transmitted over a communications network managed by an operator, the method being implemented in a security module comprising at least one processing rule established by the operator, the method comprising the following steps:

a step of reception of a request message from the terminal, the request message comprising at least one parameter based on the first packet, determination of an instruction relating to the transmission of a second packet based on the at least one parameter, according to the at least one processing rule, a step of transmission of a response message to the terminal, the response message comprising the determined instruction.

Contrary to the prior art, where the processing rules specific to an operator are stored in elements of the network (PCRF, PCEF function of the P-GW), a terminal implementing the determination method according to an exemplary embodiment of the disclosure can strictly apply the packet transmission policies as they are determined by the operator thereof, and do so without involving a request to the network, because the processing rules are stored in the security module.

This security module is local to the terminal, and is a software or hardware module, that can be included in a UICC (Universal Integrated Circuit Card) card, also known as SIM (Subscriber Identification Module) card, or in the equivalent of a UICC card for the 5G networks. Since the content of the SIM card is controlled exclusively via the operator to which the user of the subscriber subscribes, the integrity and the authenticity of the processing rules which are applied to the packets are assured. In other words, the level of security of a SIM card prevents its content from being modified by anyone other than the operator who has provided the SIM card to the user of the terminal. Thus, it is not possible for the user to modify the stream processing rules, rules which are specific to the operator and to the manner in which it manages its network.

According to one aspect of the disclosure, the determination method comprises a preliminary step of obtaining the at least one processing rule from a network node managed by the operator.

By virtue of this aspect, the processing rules used by the security module to determine transmission instructions can be downloaded or updated in line with changes to the packet transmission policies of the operator, from an entity situated in the control plan of the network operator, using a suitable protocol.

The disclosure relates also to a security module intended to be installed in a mobile terminal capable of transmitting a packet stream generated by an application installed in the mobile terminal and intended to be transmitted over a communications network managed by an operator, the security module comprising:

a module for obtaining and storing at least one processing rule established by the operator, a module for receiving a request message from the terminal, the request message comprising at least one parameter based on a packet of the stream, a module for determining an instruction relating to the transmission of the packet of the stream, according to the at least one processing rule, a module for transmitting a response message to the terminal, the response message comprising the determined instruction.

Such a security module is capable of implementing, in all its embodiments, the determination method which has just been described. It can be installed in a SIM card or one of its variants such as mini-SIM or micro-SIM, it being understood that such a card can be removably inserted into a mobile terminal.

Alternatively, this security module may be incorporated non-removably in the electronics of the terminal, in the form of a module known as "Soft-SIM" (software SIM).

The disclosure relates also to a mobile terminal capable of transmitting a packet stream generated by an application installed in the mobile terminal and intended to be transmitted over a communications network managed by an operator, the terminal comprising:

a module for obtaining a packet, called first packet, a module for analyzing the first packet, a module for transmitting, from the terminal, a second packet based on the first packet and conforming to at least one processing rule established by the operator, according to the result of the analysis.

The control method described above is intended to be implemented, in any one of its embodiments, in such a mobile terminal, equipped or not with a SIM card or a soft-SIM module.

According to one aspect of the disclosure, the mobile terminal comprises at least one security module such as that which has just been described.

The control method described above can be implemented in a terminal capable of operating with one or more operators, each operator managing a security module installed in the terminal in the form of a soft-SIM module.

The disclosure relates also to a system comprising a mobile terminal and at least one security module.

The control method can be implemented together with the determination method described above, in a system combining a terminal and at least one security module installed in the terminal in the form of a SIM card managed by an operator. Such a system can also comprise a terminal and a combination of at least one SIM card with at least one soft-SIM module.

The disclosure relates also to a computer program comprising instructions for implementing the steps of the control method which has just been described, when this method is executed by a processor.

The disclosure relates also to a storage medium that can be read by a mobile terminal, on which is stored the program which has just been described, capable of using any programming language, and of being in the form of source code, object code, or intermediate code between source code and object code, such as in a partially compiled form, or in any other desirable form.

The disclosure relates also to a computer program comprising instructions for implementing the steps of the determination method which has just been described, when this method is executed by a processor.

The disclosure relates finally to a storage medium that can be read by a security module such as, for example, a SIM card, on which is stored the program which has just been described, able to use any programing language, and to be in the form of source code, object code, or intermediate code between source code and object code, such as in a partially compiled form, or in any other desirable form.

5. DESCRIPTION OF THE FIGURES

Figures 2, 3:
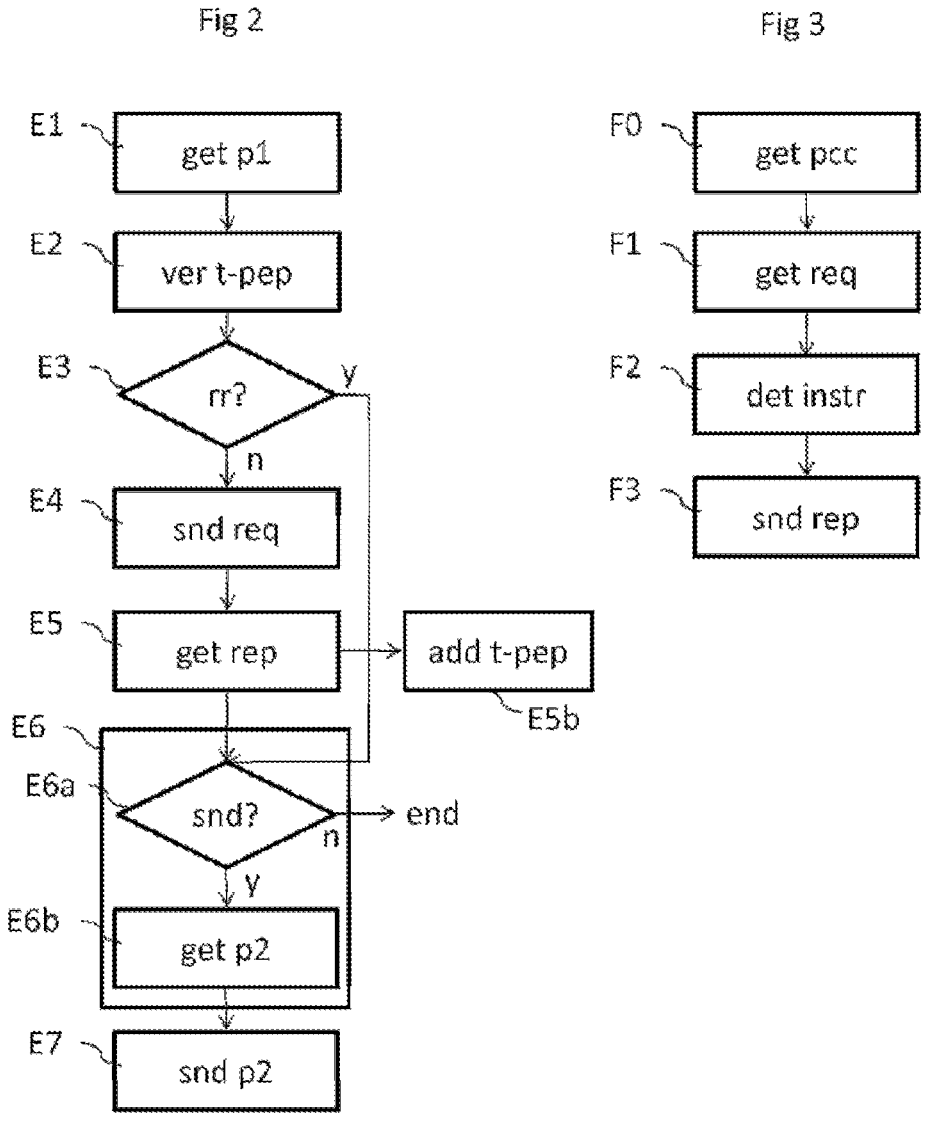

Other advantages and features of one or more exemplary embodiments of the disclosure will become more clearly apparent on reading the following description of a particular embodiment, given as a purely illustrative and nonlimiting example, and the attached drawings, in which:

FIG. 1 presents an example of overview of a mobile terminal and of a security module, according to one aspect of the disclosure, FIG. 2 schematically presents an example of implementation of the steps of a control method, according to the disclosure, FIG. 3 schematically presents an example of implementation of the steps of a determination method, according to the disclosure, FIG. 4 presents an example of structure of a mobile terminal implementing the control method, according to one aspect of the disclosure, FIG. 5 presents an example of structure of a security module implementing the determination method, according to one aspect of the disclosure.

6. DETAILED DESCRIPTION OF AT LEAST ONE EMBODIMENT OF THE DISCLOSURE

Hereinafter in the description, examples of a number of embodiments of the disclosure are presented based on the LTE standards, but the disclosure applies also to other standards such as 3G, for example with a quality of service differentiated within a "bearer", or to future standards such as 5G.

FIG. 1 presents an example of overview of a mobile terminal and of a security module, according to one aspect of the disclosure.

A SIM-PDP module controlling the packet streams transmitted by the terminal is installed on the SIM card (UICC) of the mobile terminal. Since the SIM card possesses the advantage of not being able to be modified by the user, this module profits from this advantage.

The SIM-PDP module acts as PDP (Policy Decision Point, decision point based on a policy) within the meaning of the RFC2753 standard, and the terminal, or more specifically the UE-PEP module of the terminal which is preferably implemented in a part of the terminal that cannot be modified by the user, acts as PEP ("Policy Enforcement Point") within the meaning of the RFC2753 standard.

As illustrated in FIG. 1, one of the applications APP, downloaded by the terminal or native, transmits to the IP layer of the terminal the packets P1 that it wants to transmit, after having possibly marked them using a DiffServ code. Before transmitting a packet P1 to the underlying layers (for example the PDCP layer in LTE, PDCP standard for "Packet Data Convergence Protocol", a convergence protocol for transporting data in packet mode), the IP layer transmits the packet P1 to the UE-PEP module which seeks the advice of the SIM-PDP module, which responds to the UE-PEP module by giving it the appropriate instructions, for example allowing or not allowing the packet to pass, modifying such or such a field of the header H1 of the packet P1 (for example the DiffServ code). The packet P2 actually transmitted by the terminal can therefore be different from the packet P1, in particular its header H2 compared to the header H1. The SIM-PDP module can also provide instructions which are applied to all the packets corresponding to one and the same packet stream (for example, a bandwidth limitation).

The SIM-PDP module determines the instructions to be transmitted according to processing rules determined by the policy of the operator, and according to the profile of the user, the type of stream, etc. Each processing rule associates one or more actions with one or more conditions relating typically to the values of the fields of the header H1 of the packet P1. These rules can have been loaded on creation of the SIM card.

Furthermore, for optimization reasons, the SIM-PDP module can supply the UE-PEP module with a list of rules when the terminal is started up, or in response to a request from the UE-PEP module concerning a particular packet. In order to exploit these rules, before soliciting the SIM-PDP module, the UE-PEP module therefore checks in a table T-PEP to see if it does not already have rules, called routine rules, concerning how to process the packet P1.

The SIM-PDP module can also receive an update of the rules, directly from an element of the network managed by the operator, for example by using the OTA ("Over The Air") mechanism defined by OMA ("Open Mobile Alliance") organism.

FIG. 2 schematically presents an example of implementation of the steps of a control method, according to the disclosure.

The control method allows a terminal to perform controls imposed by the operator before the transmission of a packet.

In a step E1, a UE-PEP module of the terminal, called control module, obtains a packet P1 forming part of a packet stream generated by a communication application running on the terminal.

Based on both the parameters present in the header H1 of the packet P1, and on the network management policy of the operator to which the terminal is attached by subscription, different processing operations can be applied to the packet P1 and possibly to the other packets of the same stream. The control module is responsible for controlling that.

In a step E2, the control module therefore checks in a table T-PEP to see if it includes an instruction, called routine instruction, corresponding to the processing that the packet P1 must undergo. This is done for example by searching in the table T-PEP for an instruction with an identifier of the stream identical to that to which the packet P1 belongs, this identifier being included in the header H1 of the packet P1.

In a switching step E3, the method continues to a step E4 if such a routine instruction does not exist or branches to an execution step E6, described below, if the routine instruction exists.

In a step E4, the control module transmits a request message to a security module SIM-PDP, the request message comprising at least a part of the header H1 of the packet P1. The aim of this request message is to determine what processing has to be applied by the terminal to the packet P1.

This processing must conform to the stream management policy of the operator on its network, and this is why the security module SIM-PDP is secured for the processing rules that it comprises to be modifiable only by the operator.

In a step E5, the control module receives a response message from the security module SIM-PDP, the response message comprising an instruction relating to the packet P1, established according to a processing rule specific to the operator.

In an optional step E5b following the step E5, the control module adds the receive instruction to the table T-PEP.

In a step E6, the instruction received in the step E5, relating to the packet P1, is executed by the control module UE-PEP. This step comprises a first switching sub-step E6a, in which the method continues to a second sub-step E6b if the instruction comprises an authorization to transmit the packet P1, or branches to a step E8 if the instruction comprises a prohibition to transmit the packet P1.

In the sub-step E6b, the control module prepares a packet P2 to be transmitted, which can differ from the packet P1 according to the instruction. For example, the instruction received may be to modify the header field containing the DiffServ code which is used to establish the priority with which the packet will be routed in the network.

Generally, the packet P2 differs from the packet P1 only by its header H2 and not by the payload data that it contains.

Finally, in a step E7, the terminal transmits the packet P2, with the same payload data as the packet P1, and with a header H2 that is possibly different from the header H1 of the packet P1.

In the step E8 executed in the case of prohibition to transmit the packet P1, the terminal prevents the transmission of the packet P1, and, if necessary, prevents the transmission of packets of the same stream as P1. The application which has generated the packet P1 may possibly detect that its packets are not transmitted and may terminate this stream.

It will be understood that the steps E4 and E5 are performed only for a first packet of a new stream, and not for the subsequent packets of this stream.

FIG. 3 schematically presents an example of implementation of the steps of a determination method, according to the disclosure.

The determination method enables a terminal to determine what controls imposed by the operator have to be performed before the transmission of a packet.

In a step F1, a module SIM-PDP accessible to the terminal, called security module, receives a request message from the terminal, the request message comprising at least a part of the packet P1, generally all or part of its header H1. In one embodiment, the request message can also comprise the entire packet P1. This request message corresponds to the one which is transmitted in the step E4 of the control method which has just been described in relation to FIG. 2.

In a step F2, the security module determines an instruction relating to the transmission of the packet P1, based on a table T-PDP of processing rules. This table T-PDP comprises the processing rules conforming to the stream management policy of the operator on its network. The rule which must be applied to the packet P1 depends on parameters characterizing the stream to which P1 belongs and included in the request message, such as, for example, the DiffServ code, or the destination IP address, the destination port, the transport protocol (UDP or TCP), which are also parameters of the header H1 of the packet P1.

The instruction may be to transmit a packet P2, with the same payload data as the packet P1, and with a header H2 possibly different from the header H1 of the packet P1, or it may be to not transmit the packet at all.

If the instruction is to transmit a packet P2, the content of this packet is also determined in this step F2.

In a step F3, the security module transmits to the terminal a response message comprising the determined instruction. This response message corresponds to the one which is received in the step E5 of the control method which has just been described in relation to FIG. 2.

In a step F0 independent of the step F1, the security module obtains at least one processing rule established by the operator, by a suitable protocol, and stores it in the table T-PDP. Processing rules may have been installed initially upon the customization of the SIM card, then be updated according to the changes of policy of the operator, for example by using the OTA radio mechanism.

The request message, like the response message, can take several forms. For example, the communication between the terminal and the security module can be implemented by establishing a TCP channel between the two entities, according to the procedures specified in the standard ETSI TS 102 223 ("Open Channel related to UICC server mode"). Such a channel is capable of conveying an application protocol such as OpenFlow for example.

The SIM-PDP module of the SIM card then acts as OpenFlow controller whereas the UE-PEP module of the terminal acts as OpenFlow router. Before transmitting a packet to the outside, the UE-PDP module checks (step E2) if it locally has the rule making it possible to determine how to process it and otherwise transmits it (steps E4, F1) to the SIM-PDP module by means of the Packet-In message. The SIM-PDP module examines the packet (step F2) and responds (steps F3, E5) with a packet-out message containing this packet, possibly modified (step F2b), and a list of actions, typically "set-queue" to direct the packet to a queue and "output on port X" in which port X denotes an output interface to authorize its propagation (steps E6, E7). Furthermore, to avoid overloading the SIM card by transmitting to it all the packets to be transmitted by the terminal, the UE-PEP module is configured (step E5b) such that the next packets of the same stream can be processed autonomously by the latter (steps E3, E6). For that, the SIM-PDP module can transmit to the UE-PEP module a table configuration command in the form of a "modify flow entry" message (OFPT_FLOW_MOD), in addition to the Packet-Out message.

An alternative implementation consists in upgrading the interface between terminal and security module to introduce therein messages specific to the application exchanges between the two entities.

In relation to FIG. 4, there now follows a description of an example of structure of a mobile terminal implementing the control method, according to one aspect of the disclosure.

The UE-PEP module implements the control method, different embodiments of which have just been described.

Such a UE-PEP module can be implemented in a mobile terminal UE capable of connecting to an LTE or later generation network.

For example, the UE-PEP module comprises a processing unit 130, possibly equipped with a microprocessor μP, and driven by a computer program 110, stored in a memory 120 and implementing the control method according to the disclosure. On initialization the code instructions of the computer program 110 are for example loaded into a RAM memory, before being executed by the processor of the processing unit 130.

Such a UE-PEP module comprises:

an obtaining module 140, capable of obtaining a packet P1 generated by an application installed in the mobile terminal UE, the packet P1 forming part of a stream intended to be transmitted by the terminal over a communications network managed by an operator, an analysis module 150, capable of analyzing the packet P1 using at least one processing rule established by the operator or at least one routine rule stored in a table T-PEP included in the terminal UE, a transmission module 160, capable of transmitting a packet P2 based on the packet P1 and in accordance with at least one processing rule established by the operator, according to the result of the analysis, and if the result of the analysis authorizes the transmission, an addition module 170, capable of adding a routine rule to the table T-PEP based on the result of the analysis and intended to be applied to packets of the stream following the packet P1.

The UE-PEP module may also comprise:

a transmission module 151, capable of transmitting a request message Req to a security module SIM-PDP, the request message comprising at least one parameter based on the packet P1, a reception module 152, capable of receiving a response message Rep from the security module SIM-PDP, the response message comprising an instruction relating to the packet P1 established according to at least one processing rule established by the operator, a search module 153, capable of searching in the table T-PEP for a routine rule corresponding to the packet P1.

In relation to FIG. 5, there now follows a description of an example of structure of a security module implementing the determination method, according to one aspect of the disclosure.

The SIM-PDP module implements the determination method, different embodiments of which have just been described.

Such a SIM-PDP module can be implemented for example in a SIM, mini-SIM or micro-SIM card. Such a SIM-PDP module can also be implemented in a software module incorporated in the electronics of the terminal UE, known as soft-SIM. The term "SIM card" used below designates any of these embodiments, including SIM, mini-SIM, micro-SIM and soft-SIM.

For example, the SIM-PDP module comprises a processor unit 230, equipped for example with a microprocessor μP, and driven by a computer program 210, stored in a memory 220 and implementing the determination method according to the disclosure. On initialization, the code instructions of the computer program 210 are for example loaded into a RAM memory, before being executed by the processor of the processing unit 230.

Such a SIM-PDP module comprises:

an obtaining module 240, capable of obtaining at least one processing rule PCC established by an operator and of storing it in a table T-PDP, a reception module 250, capable of receiving a request message Req from the terminal, the request message comprising at least one parameter based on a packet P1 generated by an application installed in the mobile terminal UE associated with the SIM card, the packet P1 forming part of a stream intended to be transmitted by the terminal UE over a communications network managed by the operator, a determination module 260, capable of determining an instruction relating to the transmission of the packet of the stream, including, if necessary, the content of a packet P2 based on the packet P1, according to at least one processing rule included in the table T-PDP, a transmission module 270, capable of transmitting a response message Rep to the terminal UE, the response message comprising the determined instruction.

The modules described in relation to FIGS. 4 and 5 can be hardware or software modules.

What is claimed is:

1. A method for controlling a packet stream generated by an application installed in a mobile terminal, the stream being intended to be transmitted by the mobile terminal over a communication network managed by an operator, the method comprising the following acts implemented in the mobile terminal, for controlling the transmission of all or some of the packets generated from the application:

obtaining a packet, called first packet, transmitting a request message to a security module installed in the mobile terminal, the request message comprising at least a part of the first packet, receiving a response message from the security module, the response message comprising a second packet and an instruction relating to transmission of the second packet, based on said at least a part of the first packet and conforming to at least one processing rule, and responsive to said instruction authorizing the transmission of the second packet, transmitting by the mobile terminal the second packet.

2. The control method as claimed in claim 1, wherein the instruction is further based on at least one parameter based on the first packet and established according to the at least one processing rule.

3. The control method as claimed in claim 1, wherein the act of receiving of a response message is followed by adding, in a table, a routine rule based on the instruction and intended to be applied to packets of the stream following the first packet.

4. The control method as claimed in claim 1, wherein the first packet comprises a first header and payload data, the second packet comprises a second header and payload data, said second header being different from the first header of the first packet.

5. The control method as claimed in claim 4, wherein said at least a part of the first packet is a part of the first header of the first packet.

6. The control method as claimed in claim 1, wherein the processing rule conforms to a stream management policy of the operator.

7. The control method as claimed in claim 1, wherein the processing rule conforms to a packet transmission policy of the operator.

8. The control method as claimed in claim 1, wherein the security module is implemented in a UICC (Universal Integrated Circuit Card), and wherein the UICC is implemented in hardware or software.

9. A mobile terminal capable of transmitting a packet stream generated by an application installed in the mobile terminal and intended to be transmitted over a communication network managed by an operator, the mobile terminal comprising:

a processor; and a non-transitory computer-readable medium comprising code instructions stored thereon which when executed by the processor configure the mobile terminal to perform acts comprising:

obtaining a packet, called a first packet, transmitting a request message to a security module installed in the terminal, the request message comprising at least a part of the first packet, receiving a response message from the security module, the response message comprising a second packet and an instruction relating to transmission of the second packet, based on said at least a part of the first packet and conforming to at least one processing rule, and responsive to said instruction authorizing the transmission of the second packet, transmitting, from the mobile terminal, the second packet.

10. The mobile terminal as claimed in claim 9, wherein the instruction is further based on at least one parameter based on the first packet and established according to the at least one processing rule.

11. The mobile terminal as claimed in claim 9, wherein the processer further configures the mobile terminal to add, in a table, a routine rule based on the instruction and intended to be applied to packets of the stream following the first packet, following the reception of said response message.

12. The mobile terminal as claimed in claim 9, wherein the first packet comprises a first header and payload data, the second packet comprises a second header and payload data, said second header being different from the first header of the first packet.

13. The mobile terminal as claimed in claim 12, wherein said at least a part of the first packet is a part of the first header of the first packet.

14. The mobile terminal as claimed in claim 9, further comprising:

the security module, which is implemented in an integrated circuit card installed in the mobile terminal and wherein the security module configures the integrated circuit card to:

obtain and store the at least one processing rule, receive the request message from the mobile terminal, the request message comprising the at least one parameter of the first header, determine the instruction relating to the transmission of the second packet of the stream, according to the at least one processing rule, and transmit the response message to the mobile terminal, the response message comprising the determined instruction.

15. The mobile terminal as claimed in claim 9, further comprising:

the security module, which is implemented as a software security module installed in the mobile terminal and wherein the software security module comprises code instructions, which when executed by a processor of the mobile terminal, configure the processor to:

obtain and store the at least one processing rule, receive the request message from the mobile terminal, the request message comprising the at least one parameter of the first header, determine the instruction relating to the transmission of the second packet of the stream, according to the at least one processing rule, and transmit the response message to the mobile terminal, the response message comprising the determined instruction.

16. The mobile terminal as claimed in claim 9, wherein the processing rule conforms to a stream management policy of the operator.

17. The mobile terminal as claimed in claim 9, wherein the processing rule conforms to a packet transmission policy of the operator.

18. The mobile terminal as claimed in claim 9, wherein the security module is implemented in a UICC (Universal Integrated Circuit Card), and wherein the UICC is implemented in hardware or software.

*  *  *  *  *